United States Patent [19]

Traiger

[11] Patent Number: 5,057,992
[45] Date of Patent: Oct. 15, 1991

[54] METHOD AND APPARATUS FOR CONTROLLING OR PROCESSING OPERATIONS OF VARYING CHARACTERISTICS

[75] Inventor: Mark Traiger, Riverdale, N.Y.
[73] Assignee: Dentonaut Labs Ltd., Riverdale, N.Y.
[21] Appl. No.: 336,769
[22] Filed: Apr. 12, 1989
[51] Int. Cl.$^5$ .............................................. G05B 13/02
[52] U.S. Cl. .................................... 364/148; 364/158; 364/162
[58] Field of Search ............... 364/148, 149, 158, 162, 364/164, 154

[56] References Cited

U.S. PATENT DOCUMENTS 4,577,270 3/1986 Sugano et al. ...................... 364/151

*Primary Examiner*—Jerry Smith
*Assistant Examiner*—Paul Gordon
*Attorney, Agent, or Firm*—Ladas & Parry

[57] ABSTRACT

A method and apparatus for generating feedback information from a short series of observations on one or more dynamic processes which may, for example, be obtained from a goal-driven system which is subject to unknown exogenous disturbances and/or uncertain changes in its internal characterizatics. A novel computational structure, preferably in the form of an analog circuit, is used to accomplish the aforementioned objective through its nonlinear and/or time-varying operations upon the supplied signal(s). Autonomously-tuned parameters indicate the sensitivity of the process to deterministic or random transient components (e.g., impulsive excitations). In the context of forecasting, or predictive control, the system can adapt extremely rapidly to changes in the process or signals to estimate the long-term or ultimate outcome of a closed-loop, or otherwise-compensated (goal-directed) process.

28 Claims, 3 Drawing Sheets

METHOD AND APPARATUS FOR CONTROLLING OR PROCESSING OPERATIONS OF VARYING CHARACTERISTICS

A) FIELD OF THE INVENTION

The invention relates to methods and apparatus for controlling or processing operations of varying characteristics which are uncertain and have an unknown order.

The invention is distinguishable from recursive estimation techniques which require the order or structure and even the parameters prior to the analysis or control of the operation under consideration.

The invention is an extension of the class of models known as behavioral or phenomenological models and represents an accurate approximation of natural or synthetic phenomena.

B) BACKGROUND

The invention is directed to providing systems capable of emulating the regulatory and developmental characteristics that are found in living organisms which are thermodynamically-open, nutritionally-influenced systems. Those versed in systems theory will appreciate that thermal and other initializing energy-disturbances or conditions can be fully- or partially-propagated by a closed-loop regulatory system of complex organisms, which ironically can preclude their development from being optimal. The present system incorporates means for determining a singular component that may be found in certain natural phenomena and means for determining a recursive component that may be found in other natural phenomena and the combination of these two components provides utility as a generic model for evaluation, estimation, and control purposes of various physio-chemical processes.

One open system to which the present invention is applicable is in the postnatal feeding of infants resulting in weight increase thereof. During postnatal feeding, there is an open thermodynamic system in which food intake is reflected by anticipated weight gain, whereas in adulthood energy input is sustaining of weight.

Other open-systems to which the present invention is applicable include complex electrical, mechanical or chemical systems such as coupled processes in power-generating systems, flow processes, and other time-varying networks that may be analyzed and stabilized by using Lyapunov (generalized energy) functions.

The present invention provides a method applicable to this class of techniques which, in their "dynamic programming" form, are considered to be intelligent, in that they are directed toward a long-term goal. The Riccati equation is a special linear-quadratic case that is widely employed in control theory to determine optimal feedback parameters for linear systems. In contrast, the present method represents a non-linear multiplicative form, also known as a bilinear functional factor. Unlike conventional dynamic programming, it does not impose or require asymptotic stability, but only nominal "vibrational" stationarity which more realistically represents the behavior of actual physical systems, which often display periodicity or "limit-cycles". Moreover, the nominal steady-state attained may be independent of the initial condition(s), as a result of the controlling or perturbing effect of time-varying "dissipative" groups of multiplicative feedback parameters. In other words, the invention is concerned with a process which allows transient instability as a means of compensating for disturbances, and effectively "diffuses" or dissipates the undesired conditions. This is a known property of open-systems which is retained in the present invention by incorporating open-system "energy" parameters therein. Also, whereas conventional dynamic programming relies upon a backward flow of information from the desired final condition(s), the present method is capable of operating in a feed-forward mode, and thereby can control the operation of a nonlinear, non-stationary stochastic-process, in which neither steady-state conditions, nor viable trajectories can be specified at the outset, though these may be fortuitously estimated by the present invention as more data pertinent to the process becomes available. Hence, the present invention is particularly capable of tracking self-organizing or otherwise adaptive, goal-directed, or autonomous processes, including growth, diffusion, and fractional Brownian-motion.

Other applications of the present invention include image-processing and pattern recognition. In application to a static image, time is replaced by two space variables, or one complex variable. Alternatively, processing can be carried out on a video (scanned) time-signal. In pattern recognition and "neuro" computation applications, the invention is employed in conjunction with appropriate (statistical) decision criteria, and the like.

SUMMARY OF THE INVENTION

An object of the present invention is to provide a filtering/control system that is adapted to deviations and/or variations in the (energy) in-"flow" or out-"flow" rate i.e., the input, designated by K, relative either to a running-(weighted)-average or integral thereof, or to a running norm of the (desired) outflow, or the deviation therefrom i.e., the output, designated by W, raised to the $a^{th}$ power.

Formulated mathematically, the invention provides an expression between interrelated variables K and W, which vary with respect to time, in order to approximate actual dynamic processes in which K and W are factors. According to the invention K and W are related by the expression $$S = t^{LK/w^a}$$

wherein:
S is a synthesizing or modeling characteristic;
t is elapsed time from a base time zero;
L is a coupling constant;
a is a characterizing process parameter.

The aforesaid expression establishes a multiplicative functional relation between K and W and the invention further provides for apparatus to carry out the multiplicative functional relation. In the context of feeding an infant, or other individual in an unsteady nutritional state (i.e. where desired weight change is a function of energy input), K is typically the daily caloric intake, while W is typically the body weight. It is generally desirable to maximize K relative to W, in keeping with the past history of the infant. The ratio of $k/w^a$ is referred to as the specific energy function or signal. The output W may be replaced by a suitable time function that may be provided by an arbitrary waveform (function) generator, by a digital computer or read-only-memory, or by an analog or digital tape recorder, and the like.

An adaptation operation is preferably performed by feeding the aforementioned "input" and "output" signals corresponding to said "inflows" (or "outflow" variations) and "outflows" (or error responses) into a processing means, primarily of analog electronic type. The processing means carries out a multiplicative functional operation which characterizes the invention. A multiplicative (feedback) circuit exponentiates the elapsed-time or distance signal associated with the process by the (specific "energy") ratiometric signal alluded to previously. In principle, the redistribution of energy that results from the processing performed by the computational means may manifest itself as an impulsive, accentuated change in the output therefrom, in response to a predictable variation in the input thereto. Hence, the present invention may also be utilized as a signal- or perturbation-detector. The change-detection or performance assessment may be attained by comparing either the actual inflow(s) or the relative "flow"-rate(s) at one or more instants to their respective (singularly and/or multiplicatively) processed values, as well as through the "tuning" parameters that are estimated concurrently. In previously-problematic processes of the type referred to, a control policy estimated in accordance with the present invention may be used to relieve bottlenecks, minimize delays, provide nominal stability or instability, as needed, and generally harmonize or decouple the interacting (unobserved) internal components of the "plant".

In application to processes whose viable trajectories and/or terminal conditions can be specified a-priori, the use of the present performance criterion could be altered to bring it into line with control methodologies known in the art, or which may become known to those working in this evolving discipline. Such conventional techniques include proportional-integral-derivative, bang-bang, and model-reference control. In other words, the present method may be modified to take the additional information available into consideration, while retaining the performance features of the invention.

As far as its applications to (multidimensional) signal processing are concerned, it is well-known that inverse-filtering or "deblurring" is an ill-posed problem because neither the upper limit of the convolution integral, nor the order of the transmission "channel" is known a-priori, in general. The infinite "impulse response" of the present recursive processor overcomes this difficulty by embedding the unknown distortion function in a system having controlled semi-Markov dynamics, which successively differentiates the blurred signal until it is sufficiently "sharp". Ordinarily such attempts at enhancement or "super-resolution" are compromised by the presence of noise in the signal. Presently, though, greater resistances to noise can be expected, firstly since the present multiplicative process contains a built-in adaptive, predictive filter that rapidly decouples disturbances and, secondly, since provision is made for incorporating an arbitrary weighting function to penalize or "damp" unexpected (i.e., unpredicted) changes in the signal. Also, additional (nonlinear) smoothness constraints relating the weighting function to the signal are provided. In general, the weighting function may be a (pre)-filtered version of the signal, or a reference signal that serves as a matching or tracking template. Post-filtering by conventional methods which are suited for "colored" noise may also be useful, particularly to extract a persistent trend or pattern from transient variations or "white" noise.

DETAILED DESCRIPTION OF A PREFERRED EMBODIMENT

The teachings of the present invention apply, in general, to non-stationary deterministic or stochastic signals, as may be generated by goal-directed open-systems, including diffusion, flow, and other transport processes, especially those combined with chemical reactions, as well as by adaptive closed-loop systems. However, the description will be given largely with regard to its application in controlling the feeding of an infant. Its application to industrial fermentation processes will be readily apparent to those skilled in the art of systems-theory and biotechnology. A "diffusive" modification of the hereafter-defined S-relation will be described later.

Logical embodiments to facilitate tracking of predetermined trajectories and to compensate for departures from balanced, stationary-states will also be disclosed later.

The essence of the processing technique of the invention is in the following "state-variable" transformation relation, hereinafter referred to as the S-process, or simply S $$S = t^{LK/W^a}$$

wherein:
K is a (control) "input" (e.g., calories/day);
W is the (cumulative) "response" (e.g., weight);
L is a coupling constant;
t is elapsed time from a base time zero, e.g. time after start-up;
a is a process parameter.

In other applications, W may be the concentration of a reaction substrate or the amount of product, etc. It is to be understood that K and W vary with time. The elapsed time, along with other operational (circuit) parameters, may be periodically reset to account for "batch"-like process operations, or other discrete-event phenomena.

Figure 2:
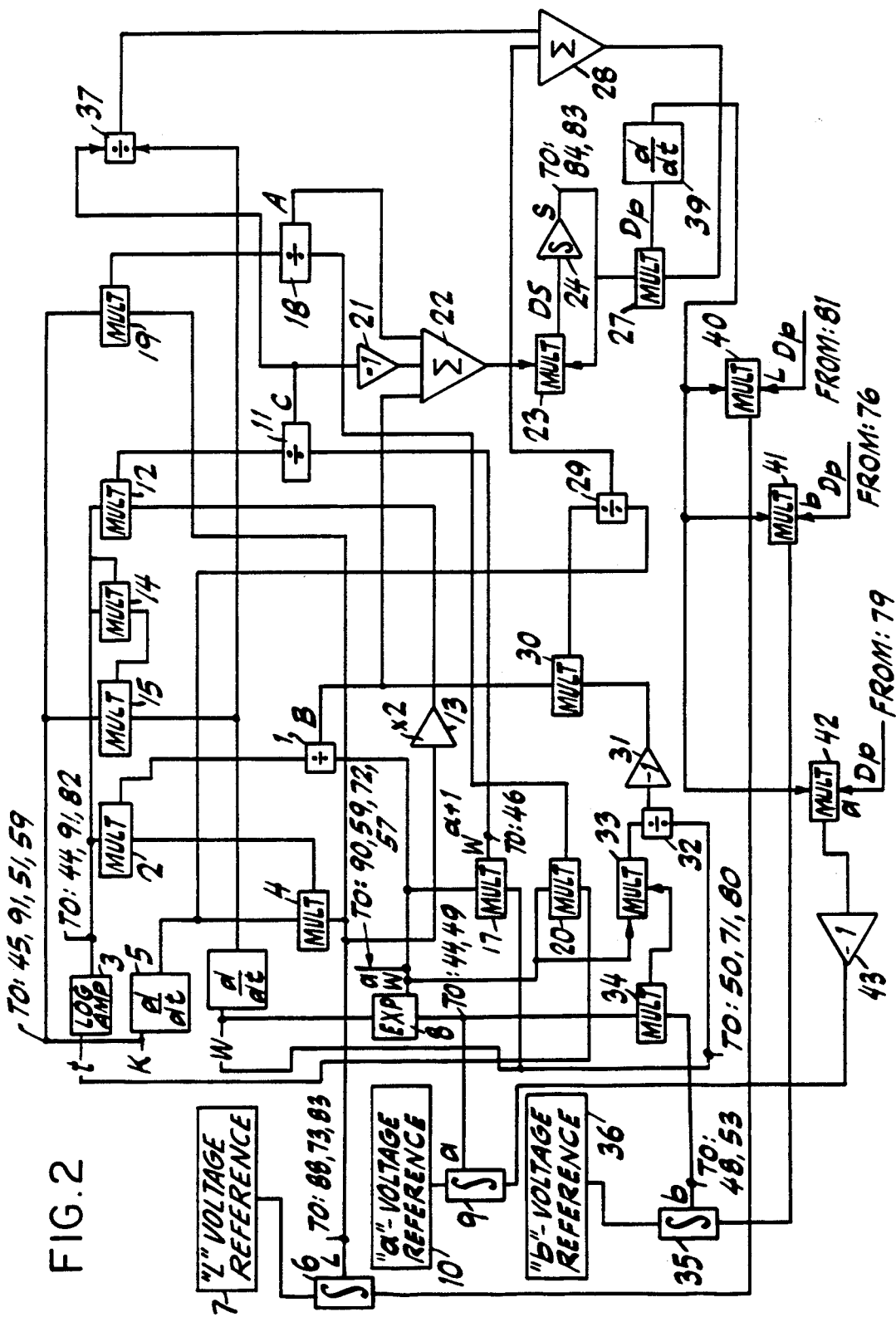
FIGS. 2 and 3 collectively illustrate a schematic circuit diagram of one embodiment according to the invention.

Taking the total derivative of the above expression leads to the multiplicative form that is implemented by a portion of the analog circuit which is to be found in FIG. 2. Said total derivative may be expressed as:

$$DS = S\frac{LK}{tW^a} + S\frac{L\ln(t)}{W^a}\frac{dK}{dt} - S\frac{aLK\ln(t)}{W^{(a+1)}}\frac{dW}{dt}$$
$$= S[A + B - C]$$

As indicated above, the multiplicative process involves three separate terms A, B, and C. The realization of each of these terms and their operative combination can be clearly seen in the detailed analog electronic circuit shown in FIG. 2, as described hereafter. First, however, an overview of the system, as diagrammatically illustrated in FIG. 1, will be presented.

Figure 1:
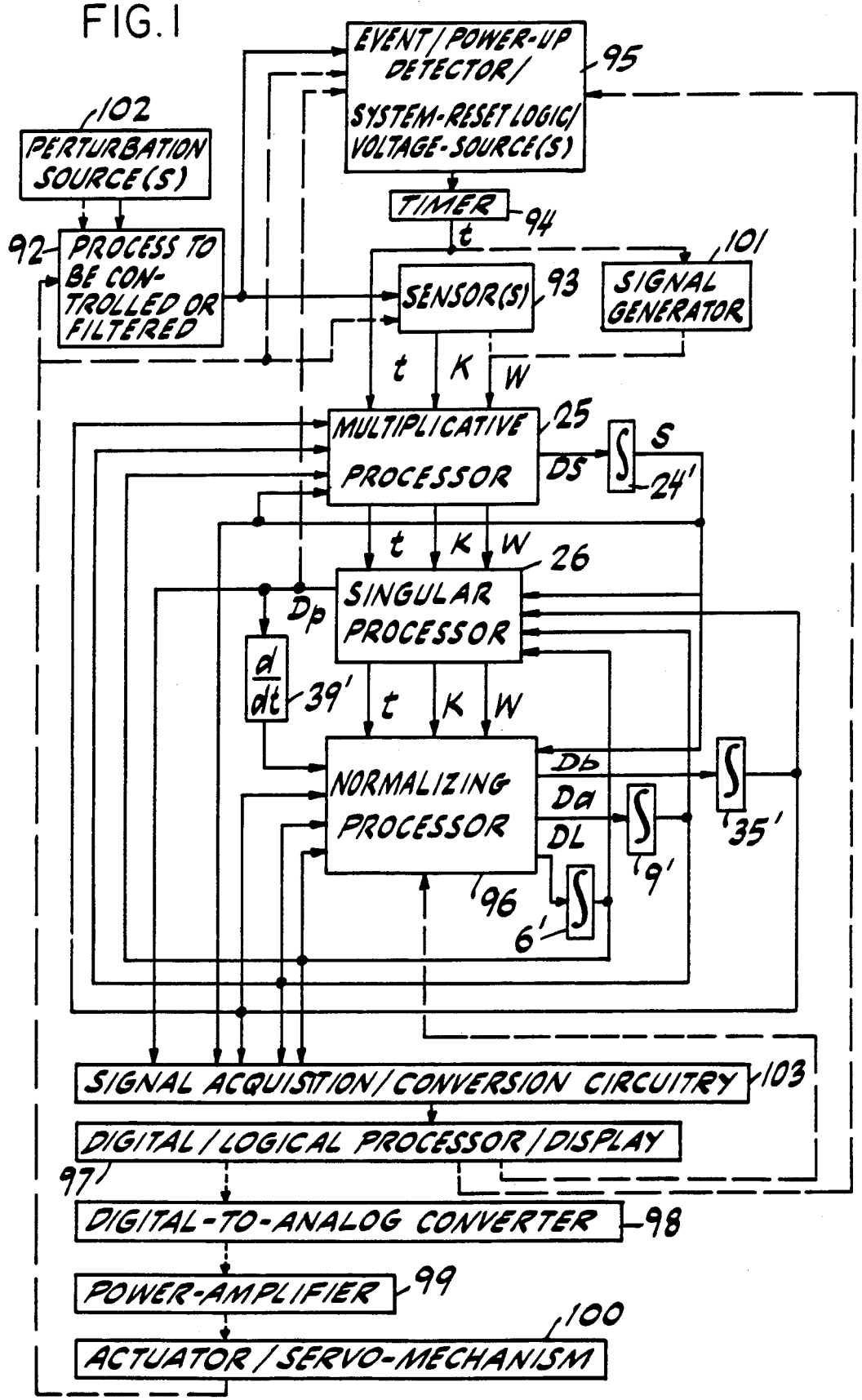
FIG. 1 is a diagrammatic illustration of apparatus according to the invention.

In FIG. 1, box 92 represents the process to be controlled or filtered. The process is subject to unknown disturbances from one or more perturbation source(s) 102. The input(s) and/or output(s) from are transduced into appropriate signals (electrical, optical, or other) by one or more sensors 93. The process-output signal(s) may then be pre-processed or otherwise decomposed through conventional filtering or integrating means to produce a signal that has less noise, or otherwise has more information regarding the process. In the process-control context, the process-output, "W", is fed into a multiplicative-processor 25, together with the process input(s), "K". In the absence of measurable process-inputs (e.g., in the context of signal-processing) the process output may be assigned to the "K" processor-input-signal, while the "W" processor-input, which takes on the connotation of an expected growth or cumulative "error", may be supplied by an optional signal-generator 101.

The first stage in the system is the above-defined multiplicative process (totally-differentiated "S"-relation), which is carried out in block 25 in FIG. 1. Since the multiplicative processor 25 must keep track of the time that elapses from the start (or re-start) of processing, which preferably coincides with a physically-meaningful event, such as the occurrence of a singular perturbation or condition, a suitable electronic timer 94 is connected to processor 25. The timer 94 can be activated either automatically upon system power-up or, preferably, electronically, in response to one or more trigger-input(s) to a suitable process-related event-detector 95, which may also include logically-selectable/digitally-programmable voltage-sources for system-resetting and/or initializing purposes, particularly in regard to the initial "charging" of the various integrators.

The "DS" value output from the multiplicative processor 25 is fed to an integrator 24' to produce the synthetic state-variable-signal, "S", that is then fed-back, to the input of multiplicative-processor 25, as well as forward into a singular (reduced-order) processor 26, which produces a singular (i.e., correlated) perturbation-signal, "Dp", that is associated with the ("K"-input to the) multiplicative "S"-process. The singular perturbation-signal, "Dp", generated by processor 26, is fed to a differentiator 39', and thence to the normalizing processor-section 96, which also receives the "S"-signal.

The purpose of said normalizing processor 96 is to produce parameter adjusting signals, "Da", "Db", and "DL", which are then fed to integrators 9', 35', and 6', respectively, to produce the corresponding parameter signals, "a", "b", and "L". It is to be understood that when the letter "D" precedes another letter, it refers to the time derivative of the signal represented by the latter letter. The parameter signals are then fed-back as additional inputs to the normalizing, singular, and multiplicative processors 96, 26, 25.

The output signals from the three processors 96, 26, 25 are fed to an output section which comprises signal acquisition/conversion circuitry 103, a digital- (i.e., micro-electronic or logical) processor and display 97, a digital-to-analog converter 98, a power-amplifier 99, and an actuator/servo-mechanism 100. The latter is used to effect a change in a control variable in a physical process (e.g., a flow-rate of fluid supply to an infant). The mechanism 100 generally is not needed if the process 92 being controlled is purely or primarily electrical in nature. Digital output signals that are optionally generated by (micro-computer/controller) 97 may be used to control the operation of said normalizing processor 96, and said (switch-selectable) system- and/or timer-resetting voltage-sources 95. It is to be appreciated that any suitable computer-output device can be used in conjunction with digital-processor 97, including laser printers and video monitors, with the addition of the necessary interfacing means. Moreover it should be recognized that the signals which are fed into processor 103 may be sent into an analog or digital-oscilloscope for display and evaluation purposes.

Before describing the detailed analog embodiments of the three processing sections 96, 26, 25, the mathematical representation of the aforesaid singular (reduced-order) process 26 will be given. The singular representation is an integral adjunct to the method of the present invention as it incorporates the "S-relation" of the invention. Taking the S-relation, as given above, the aforementioned singular-perturbation problem is formulated by adjoining an allometric constraint to the Lagrangian "performance function", comprised by S to form a Hamiltonian expression, H, as follows:

$$H(t,W,K,a,b,L,p) = S(t,K,W,a,L) + p(K - bW^a)$$

where p is a Lagrange multiplier, representing the marginal effect of the allometric constraint; a and b are allometric "tuning" parameters, and L is the coupling parameter which may be a function of the process variables, such as temperature, enzyme concentrations, etc. Following well-known edicts of systems theory, the Pontryagin Maximum Principle, as presently applied leads to the following set of canonical, equations for p and its derivative, Dp:

$$H_k = p + [L\ ln(t)W^{-a}{}_tLKW^{-a}] = 0$$

where the above expression represents the partial derivative of the Hamiltonian expression with respect to the "control," K . . . along with:

$$-H_W = [aLK\ ln(t)W^{-(a+1)}][t^{LKW^{-a}}] + pabW^{(a-1)} = dp/dt = D_p$$

where this is obtained from the negated partial derivative of H with respect to W, as indicated.

While the above-two equations may be used in conjunction with any one of a number of different (iterative) equation-solving methods in order to estimate Dp, p, "b" and, possibly, "L" and "a" as well, from a suitable set of data "points" (t, k, W), for non-iterative (e.g., analog or recursive-digital) processing purposes, the above-two equations may be combined to obtain an implicitly-multiplicative (i.e., recursive) expression for Dp, as follows:

$$D_p = S\left[-D(B)\left(\frac{dK}{dt}\right)^{-1} + C\left(\frac{dW}{dt}\right)^{-1}\right]$$

where, $$D = abW^{(a-1)}$$

As mentioned previously, the above expression for Dp represents what has been referred to presently as a reduced-order processor, and its preferred implementation is to be found in FIG. 2, in conjunction with that of the aforementioned (definitive) multiplicative processor, the particulars of which are set-forth below.

Figure 3:
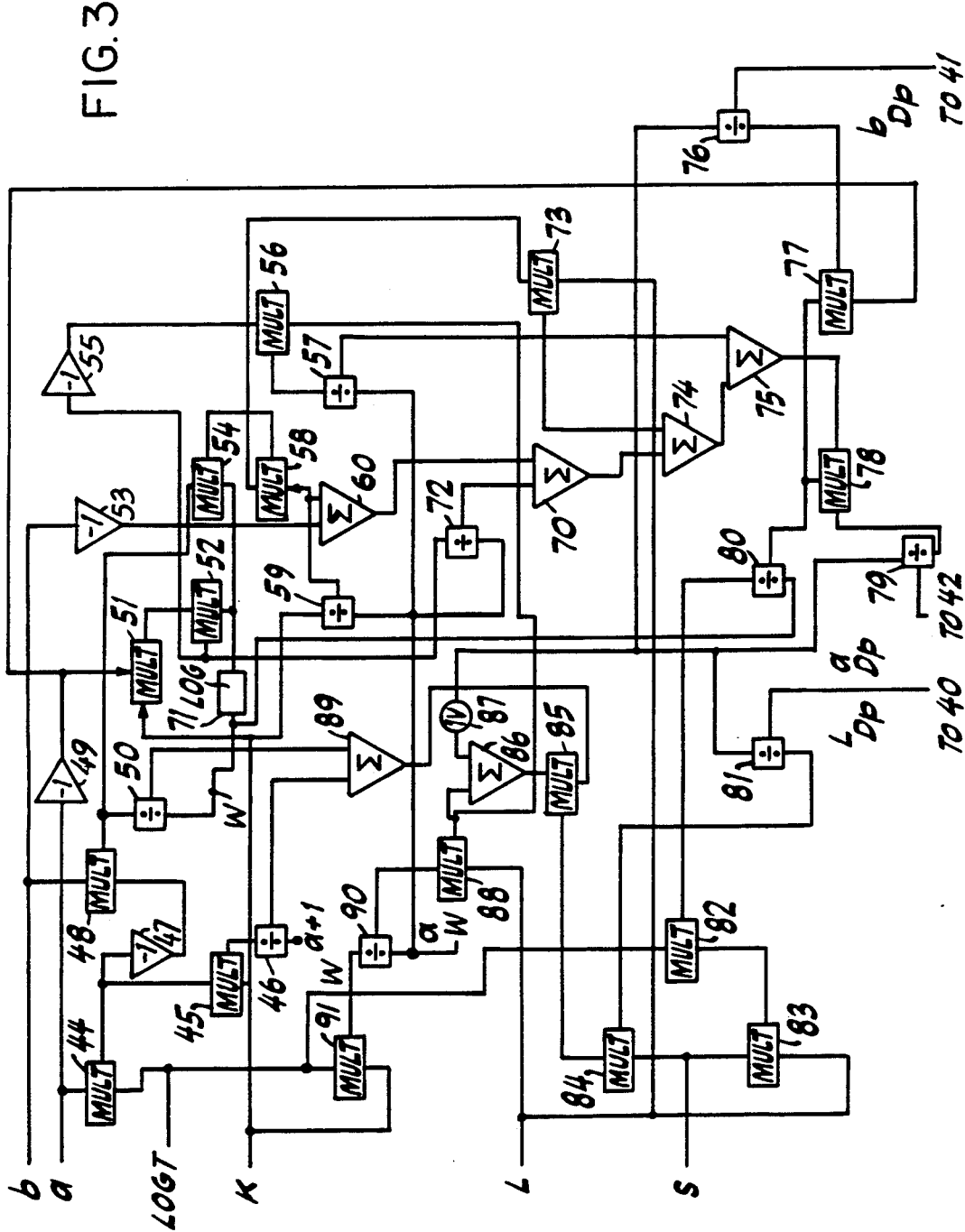

The B-term is generated at the output of a divider 1, the dividend of which is taken from the output of a multiplier 2, which produces the product of a logarithmically-transformed elapsed-time signal, t, supplied to it from a logarithmic amplifier 3, with the output of a multiplier 4, that generates the product of a differentiated process "input" signal, obtained from the output of a differentiator 5, with the output of an integrator 6, whose primary input is an appropriate feedback signal generated by the singular (reduced-order) processing section 26, together with the "normalization" portion of the newly-disclosed processing circuit which, as can be seen in FIG. 3, is also singular (i.e., algebraic) in nature. Integrator 6 is also, at appropriate times, connected to an "L-parameter" variable voltage-reference 7. The divisor input for divider 1 is taken from the output of an exponentiator 8, such as the multifunction converter, model 4302, of the Burr-Brown Research Corp. (Tucson), the "Z"-input of which is a fed-in process-"output" signal, W, while the exponent ("m-sub-c") input thereof is the output of integrator 9, the primary input to which is the corresponding (inverted) feedback voltage which is produced by the normalizer circuitry in FIG. 3, together with the time-derivative of the singularly-processed multiplicative signal. There is also a resetting and/or initializing "a-parameter" voltage-reference generator 10 connected to integrator 9 through a suitable manual or electronic switching means. The "C"-term is produced at the output of analog divider, 11, the divident of which is taken from multiplier 12, one of whose inputs is connected to the output of summing amplifier 6, via a non-inverting amplifier 13 having a gain of two, the other of whose inputs is the output of a multiplier 14, the inputs of which are the output of logarithmic amplifier 3 and the output of another multiplier 15. The inputs to the multiplier 15 are the "input" signal, K, and the "output" signal, W, after passage through a differentiator 16. The divisor input to divider 11 is the output from a multiplier 17, the inputs to which are the output from exponentiator 8 and the "output" signal, W.

The "A"-term is found at the output of a divider 18, the dividend of which is taken from the output of multiplier 19, one of whose inputs is the "process-input", K, the other of whose inputs is the L-parameter "signal" from integrator 6. The divisor of divider 18 is taken from the output of a multiplier 20, one input of which is the elapsed-time "signal", the other input of which is connected to the output of exponentiator 8.

Taking the "C-signal" output from divider 11, inverting it in inverting amplifier 21, and summing said inverted "C-signal" with the "B" and "A" outputs from dividers 1 and 18, respectively, through the use of a summing-amplifier 22, yields the operational multiplicative input to multiplier 23, the output of which is the "S-derivative" signal, "DS", which upon integration through integrator 24, produces the S-signal, which serves as the other input to multiplier 23. The aforesaid "DS"-signal from multiplier 23 corresponds to the output from the multiplicative-processor 25 in FIG. 1 which, in turn, provides the input to the reduced-order processing section 26, after it has passed through integrator 24'.

Returning to FIG. 2, one can see that the S-signal from integrator 24 is connected to one of the inputs of a multiplier 27, the other input of which is connected to the output of a summing amplifier 28, which produces an algebraic combination of the aforementioned "B" and "C" signals, as follows. One input to summing amplifier 28 is taken from the output of a divider 29, the dividend of which is taken from the output of a multiplier 30, one of whose inputs is the "B"-signal from the output of divider 1, the other of whose inputs is another "group" signal, D, which has been passed through an inverter 31. The "D"-input to said inverter is produced by a divider 32, the dividend of which is taken from the output of a multiplier 33, one of whose inputs is the output of exponentiator 8, the other of whose inputs is the output of a multiplier 34, the inputs thereto being the "a-parameter" signal from integrator 9 and a "b-parameter" (compensating) signal. The latter signal is taken from an integrator 35, the primary input to which is the corresponding (non-inverted) "normalization" signal, the origin of which will be described shortly. Also, there is a "b-parameter" reference-voltage generator 36 connected to integrator 35 through a suitable switch. The divisor fed to divider 32 is simply the "output" signal, W. As stated above, the "D"-signal is fed through inverter 31 and thence to multiplier 30 which produces the product of the negated "D"-signal with the "B"-signal. Said product is the dividend signal fed to divider 29, the divisor of which is the differentiated "K"-input signal from differentiator 5. The quotient from divider 29 is then used as one of the inputs to summing amplifier 28 (as indicated previously), the other input of which is taken from the output of divider 37. The dividend of divider 37 is the "C"-signal from the output of divider 11, while the divisor thereof is simply the differentiated "output" signal, W, obtained from differentiator 16. The output of multiplier 27 holds the particular significance of being the output signal, "Dp", of the reduced-order processor 26, as shown in FIG. 1. Returning once again to FIG. 2, said "Dp"-signal is fed into a differentiator 39, and thence to multipliers 40, 41, and 42. The outputs of said multipliers are the normalization signals for the L, b, and a parameters, respectively, and are therefore fed into the corresponding integrators, as described above.

With regard to the interconnections between the circuitry in FIGS. 2 and 3, the "a"-signal from integrator 9 is fed into multiplier 44, the other input of which is the logarithmically-transformed elapsed-time signal from log amplifier 3. The output from 44 is, in turn fed into another multiplier 45, the other input of which is the "K"-input signal. The output from 44 is also fed into an inverting amplifier 47, which in turn is an input to multiplier 48, the other input of which is the "b"-signal from integrator 35. The output from 48 is the dividend input to divider 50, the divisor input of which is the "W"-(process-"output")-signal. The output from divider 50 is fed to summing amplifier 89, along with the output from divider 46. The dividend input to the latter is the output from the multiplier 45, while the divisor input thereto is taken from multiplier 17. The output from summing amplifier 89 is one of the inputs to multiplier 85, the other input of which is the output from another summing amplifier 86. One of the inputs to the latter is a one-volt offset from a (regulated) voltage-source 87. The other input thereto is the output from multiplier 88, one of whose inputs is the "L"-signal from integrator 6, the other of whose inputs is the output from a divider 90. The dividend input of the latter is the output of a multiplier 91, the inputs to which are the "K"—and logarithmically-transformed elapsed-time signals. The divisor input to 90 is taken from the output of exponentiator 8. Returning to summing amplifier 86, its output is fed into multiplier 85, the other input of which is taken from the output of summing amplifier 89, as mentioned previously. The output from multiplier 85 is fed into another multiplier 84, the other input of which is the "S"-signal from integrator 24. The output from 84 is the divisor input to a divider 81, the dividend input of which is constant at one-volt, as it is taken from voltage-source 87, thereby enabling 81 to produce the reciprocal of the sensitivity of the "Dp"-signal with respect to the "L"-(parameter)-signal, as is needed in the following "normalization" expression for the latter.

$$\frac{dL}{dt} = (L)_{Dp} \cdot \frac{d(Dp)}{dt}$$

wherein L is the normalization signal $$(L)_{Dp} = \left[ S \left[ \frac{-ab\ln(t)}{W} + \frac{aK\ln(t)}{W^{a+1}} \right] \left[ 1 + \frac{\ln(t)KL}{W^a} \right] \right]^{-1} .$$

The above sensitivity function from divider 81 is sent to one input of multiplier 40, whose other input is the "Dp" time-derivative, whereby the above "L"-normalization signal is produced.

The normalization signal for the "a"-parameter is produced at the output of a divider 79, the dividend input of which is at the aforementioned one-volt level, as obtained from voltage source 87. The divisor input of 79 is taken from the output of multiplier 78, one of whose inputs is the output from summing amplifier 75, the other of whose inputs is the output of another divider 80. The divisor input of the latter is the "W"-signal, while the dividend input thereof is taken from the output of a multiplier 82. One input to the latter is the logarithmically-transformed elapsed-time signal from 3, while the other input thereto is the output of another multiplier 83, one of whose inputs is the "S"-signal from 24, the other of whose inputs is the "L"-signal from 6. Returning to summing amplifier 75, it is seen that one of its inputs is the output of another summing amplifier 74, while its other input is taken from the output of a divider 57. The divisor input of the latter is taken from exponentiator 8, while the dividend input thereof is the output of multiplier 56. One input to the latter is the aforementioned output of multiplier 88, while the other input thereto is the output from another multiplier 52, after having passed through an inverting amplifier 55. One input to 52 is the logarithmically-transformed "W"-signal, as produced by logarithmic amplifier 71, while the other input thereto is the output from another multiplier 51. One input to the latter is the "K"-signal, while the other input thereof is produced by an inverting amplifier 49, that negates the "a"-signal from 9. Returning to summing amplifier 74, one input thereof is another summing amplifier 70, while the other input thereof is the output of a multiplier 73. One input to the latter is the "L"-signal from 6, while the other input thereto is the output from another multiplier 58, one of whose inputs is the output of another multiplier 54, the other of whose inputs is the output of a divider 59. The dividend input of the latter is the "K"-signal, while its divisor input is taken from the output of exponentiator 8. Returning to multiplier 54, one input thereto is the aforementioned output from 71, while the other input thereof is the aforementioned output from multiplier 48. Returning to summing amplifier 70, one input thereto is the output from another summing amplifier 60, while its other input is the output from a divider 72. The dividend input of the latter is the aforementioned output from multiplier 52, while the divisor input thereof is the aforementioned output from exponentiator 8. Returning to summing amplifier 60, one input thereto is the output of an inverting amplifier 53, which negates the "b"-signal from 35, while the other input thereof is the aforementioned output from divider 59. Having thus described one physical means by which the "a"-signal can be normalized, the following is the mathematical representation of said means:

$$\frac{d(a)}{dt} = (a)_{Dp} \frac{d(Dp)}{dt}$$

where, $$(a)_{Dp} = \left\{ \frac{SL\ln(t)}{W} \left[ -b + \frac{K}{W^a} - \frac{a\ln(W)K}{W^a} - \frac{ab\ln(W)\ln(t)LK}{W^a} + \frac{aK^2\ln(W)\ln(t)L}{W^{2a}} \right] \right\}^{-1} .$$

The normalization signal for the "b"-parameter is found at the output of a divider 76, the dividend input to which is at one-volt, as a result of its being connected to the aforementioned voltage-source 87. The divisor input thereto is taken from the output of a multiplier 77, one input to which is the aforementioned output of inverting amplifier 49, the other input to which is the previously-mentioned output of divider 80.

Accordingly, the following is the expression for the "b" normalization-process:

$$\frac{d(b)}{dt} = (b)_{Dp} \cdot \frac{d(Dp)}{dt}$$

where, $$(b)_{Dp} = \left[ \frac{-aL\ln(t)}{W} \cdot S \right]^{-1} .$$

With regard to the figures of the drawing, those skilled-in-the-art will recognize that routine components such as pull-up and other resistors, resistive trimmers, (electronically-controlled) reset switches, charge-storing capacitors, grounding, buffer-amplifiers, and voltage sources and the like are not all shown, as they do not contribute to the inventive level of the structure of the circuit and furthermore would not be employed in a non-electronic (e.g., optical) implementation.

In the case of an electronic realization of the present system, a commercially-available analog computer, such as the one produced by Comdyna, Inc. (Barrington, Ill.) would incorporate all the necessary "building-block" components, as well as optional parts such as power-amplifiers and servo-motors, etc. Said analog computer would be "programmed" (i.e., wired) in accordance with the present disclosure. An additional consideration in the connection thereof is to employ an offset on the elapsed-time variable, so that its initial value is greater than unity. For long periods of operation, said time-variable may also have to be fractionally-scaled. The same may hold true for the "inflow(s)" and normed "outflow(s)". In a digital numeric implementation, on the other hand, the expression DS may be ratiometrically written for discretely-sampled signals as:

$$(L)(KA)(TA)^{-1}(WA)^{-a} +$$
$$(L)(KA)\ln(TA)(WA)^{-a} [(KB)(KA)^{-1} -$$
$$(a)(WB)(WA)^{-1} + a] =$$
$$[TB^{(L)(KB)(WB)-a}][TA^{(L)(KA)(WA)-a}]$$

wherein:
TB = current time (or midpoint of interval);
KB = (average) rate of energy consumption (dissipation) at time TB;
WB = (average) weight or concentration of biomass at time TB;
TA = immediately previous observation time or interval midpoint;
KA = (average) rate of energy consumption at time TA;
WB = (average) weight (concentration) of biomass at time TA.

The above expression is repeated (n−1) times, given n serial observations. In other words, the first backward "difference"-equation employs time "n" for TB and time "n−1" for TA; in the second such equation, time "n−1" now becomes TB, while time "n−2" is TA. Finally, in the (n−1)th such equation, the first and second observations are assigned to TA and TB, respectively. Those skilled in the art of dynamic systems-analysis will recognize that this equation represents a "backward-difference" algebraic-approximation to a time-varying differential equation which, in conjunction with a series of input and/or output observations, generates a set of approximating algebraic equations, whose unknown "a"- and "L"-parameters can be estimated through an iterative (i.e., trial and error) searching-algorithm, such as the Levenberg-Marquardt one. The need to program the latter is removed by the existence of commercially-available software packages such as MathCAD, which is a product of MathSoft, Inc. (Cambridge, Mass.). The same holds true subsequent to the addition of discretized equations for "p" and "Dp", whose generation from the presently-disclosed "Hamiltonianized"/canonized (i.e., allometrically-constrained/compensated) S-process would be readily apparent to those skilled in the art of numerical methods. In numerical practice, the discretized "p" and "Dp" equations are linked by incre-menting (or decrementing) the Lagrange multiplier, "p"-"one", that is assigned to the starting time, by the product of the quantity "Dp" with the elapsed time. In most cases, one is dealing with a "positive-definite" system for which an allometric deviation factor is increasing with time, so that Dp should be constrained to be positive, assuming that the cumulative "outflow," W, is also increasing. The parameters to be estimated from these coupled (algebraic) equations, in addition to those mentioned previously (namely, a and L) may include: p, Dp, and b. Additionally, both the controlling in-flows and the resulting cumulative out-flows (or end-product concentrations, etc.) may be sequentially estimated at two successive times by solving the equations generated in accordance with the three cited relations. Those skilled in the relevant arts will recognize that the aforementioned signal-estimation process would generally be performed jointly with the estimation of the unknown parameters.

In a "stochastic" signal-processing context, the "controls" to be estimated represent an enhanced or filtered version of the inflow(s), K. In said context, the outflow, W, may be taken to be a suitable time-function, preferably one that enables the S-process to satisfy the the product of the square of the elapsed-time with the logarithm of the elapsed-time. An alternative utilization of the present system for signal estimation purposes would be to assign the observed signal to "W" and the time-derivative thereof to "K". In this approach the output from differentiator 16 would be connected to the input to differentiator 5.

In an n-dimensional application, one would formulate "n" S-relations (i.e., one for each dimension). For example, in a two-dimensional image-deblurring or sharpening embodiment, one would have two S-relations, one in which the time-variable, t, is replaced by the "x"-component of position in a rectilinear coordinate system, while "K" is taken to be the directional derivative of the image-(intensity)-function in the "x"-direction, and the other in which time is replaced by the "y"-component of position in said coordinate system, with "K" being taken as the directional derivative of the image in the "y"-direction. In each of the aforesaid "spatial" S-relations, "W" would simply be the observed (integrated) image-intensity within each picture element (pixel). Naturally, the two aforesaid S-relations may be associated with each point or "pixel" in an image. The electronic generation of said "spatial" state-variables, "S", would be readily apparent to those versed in the art of charge-coupled-device-technology. In forming the (two) Hamiltonian expressions associated with the two aforementioned "spatial" S-relations, allometric or Markovian models relating the "x" and "y" components of "K" to "W" would be added to said spatial (i.e., "x" and "y") S-relations respectively. Since "W", as presently defined, would be common to both the "x" and the "y" Hamiltonians, said Hamiltonians may be combined, whereby a single allometric deviation factor "p" would be associated with said combined Hamiltonians and would be dynamically "computable" therefrom, along with the "x" and "y" components of "a", "b", and "L". A multi-dimensional version of the "diffusive" (smoothing) embodiment is also readily apparent. It should also be noted that multiplication of spatially- and temporally defined S-variables in order to facilitate spatial-temporal data processing is also feasible.

In either signal-processing or control applications, the above-described iterative solution is of use primarily in an "off-line" a-posteriori/analytical mode-of-operation because of the amount of time required to locate the "best" estimate by a trial-and-error approach. Naturally, advanced digital-signal-processing chips and systems could be employed to attain higher operational speeds.

As an alternative to the aforementioned iterative approach, a fast, "on-line" estimation method is actually an inherent feature of the present "analog" multiplicative (i.e., recursive) formulation and can easily be implemented either in MathCAD using a personal computer, on a programmable calculator such as the HP-41CV from Hewlett-Packard (Corvallis, Oreg.), or on a mini-, mainframe-, or micro-computer using a suitable programming language, such as "C". The present inventor has, in fact, utilized MathCAD in both estimation schemes, and has found each to offer significant insights into the behavior of complex processes. The following steps are generally involved in the latter estimation process:

1) Set i=1 for first set of values.
2) Enter initial conditions for $S_i$, $p_i$, $a_i$, $L_i$, and $b_i$.
3) Input number, n, of samples to be taken.
4) Input data $t_i$, $K_i$, $W_i$: i=2 to n.
5) Enter coupled expressions for $(Ds)_i$, $(Dp)_i$, $(Da)_i$ $(DL)_i$, and $(Db)_i$ as finite-difference approximations.
6) Compute:
   $S_{i+1}$ from $S_i$ and $(DS)_i$;
   $p_{i+1}$ from $p_i$ and $(Dp)_i$;
   $a_{i+1}$ from $a_i$ and $(Da)_i$;
   $L_{i+1}$ from $L_i$ and $(DL)_i$;
   $b_{i+1}$ from $b_i$ and $(Db)_i$.
7) i=i+1.
8) If i is less than n, then repeat from step 2, or else end.

Additionally, optional evaluative steps, such as the computation of the magnitude-squared coherence between two, or more, of the estimated signals can be readily implemented in MathCAD by utilizing its Fourier-transform capability.

DESCRIPTION OF LOGICAL EMBODIMENTS OF THE INVENTION

While the present inventor's simulation trials of the disclosed processing structure have revealed superb "tracking"/adapting ability, from the standpoint of the coherence between the singularly-perturbable parameter-signal, "a", and the process input, an optional embodiment to facilitate the handling of processes that are required to reach a nominally-steady "terminal"-state may be logically-provided, as follows. At any given time, a ratio of the differentiated "Dp"-signal to an (adjustable) short-term moving average thereof could be optionally-computed electronically and compared to unity, such that a "true" logic-level voltage (e.g., 5-volts) is produced if said ratio is greater-than-one, whereas a "false" logic-level voltage (e.g., 0-volts) is produced if said ratio is one, or less. Similarly, a polarity-detection circuit (such as the one shown on pg. 363 in "nonlinear circuits handbook," published by Analog Devices, Inc.) would be used to produce a "true" logic level if the time-derivative of the actual (or (expected) "K"-signal is greater than zero, and a "false" logic level if said signal is zero, or less. Said comparator and polarity-detector outputs would then be inputted into an "exclusive-or" digital gate which generates a logical 1 when said input-signals are which logically-different. In other words, if the trend of the allometric deviation factor velocity-signal is not in accordance or "congruence" with that of the reference (or actual, moving-average-filtered) input-signal (because of a deviation from the nominal trajectory thereof), then an inverting amplifier could automatically (and sequentially) be switched into and/or out-of one (or more) of the parameter-"tuning" signals that are produced by multipliers 40, 41, and 42. Instead of evaluating the trend of the aforementioned allometric deviation factor velocity-signal by a ratio (using a costly analog divider), the polarity of the (moving-average of the) twice-differentiated "Dp"-signal, which corresponds to the allometric deviation factor acceleration signal can be converted to a logical signal with same circuit cited for use with the differentiated-and-averaged process-input signal, "K".

Alternatively, for faster albeit less-coherent tracking, instead of, or in addition to the aforementioned "K"-velocity/"Dp"-acceleration "congruence"-evaluation, the previously-cited polarity-detection/logic-level-conversion circuit may be separately applied to the derivatives of the K and W signals, and the outputs therefrom could then be fed into an exclusive-or gate, whose output operates an analog-multiplexer, such as the MPC800 device produced by Burr-Brown Research Corp., Tucson, Ariz. In simplified practice, the differentiated "Dp"-signal from 39, rather than the individual parameter-tuning signals from 40, 41, and 42, could be fed through a unity-gain inverting amplifier, with the output therefrom being sent to input "1A" of said analog-multiplexor, which also receives the non-inverted version of said signal at its "2A" input. The output from said multiplexor, which is logically-selected to be either the (+) or (−) differentiated "Dp"-input thereto, would be substituted for one or more of the "Dp"-velocity inputs to multipliers 40, 41, 42. The input-selecting (addressing) signal would be the output of the aforementioned exclusive-or gate, which would be connected to the A-"zero" address input of said multiplexor. Hence, according to the truth-table of said multiplexor and the above-described input-output connections thereto, when K and W are changing in the same direction, the polarity of the parameter-sensitivity signals from 76, 79, and 81 would be negated upon multiplication by the selected, (−), Dp-velocity input. On the other hand, if K and W are changing in opposite directions, then the polarity of said parameter-sensitivity signals will not be negated.

The "dual" mode-of-operation of the cited multiplexor enables the previously described "congruence" evaluation to The "dual" mode-of-operation of the cited multiplexor enables the previously described "congruence" evaluation to be used in order to enhance the robustness of the present logically-augmented parameter-adaptation process. This could be done by connecting the binary congruence signal from the first-mentioned exclusive-or gate to the "1A-" address input-line of the cited multiplexor which, in addition to having the aforementioned "1A" and "2A" inverted and non-inverted "Dp"-velocity inputs, would also have the same signals going to the "2B" and "1" multiplexor-inputs, respectively. Hence, if there is a lack of "congruence", for whatever reason, then the polarity of the (parameter)-perturbation/modulation signals will be reversed. This is achieved by deriving the "a", "b", and "L" modulation-signals from the sum of the multiplexor's A- and B-outputs. Instead of connecting the aforementioned (non)-congruence signal to the A-"3" (A-or B-output) address-line, a "sufficiency-" signal based upon the well-known "second-variation" extremum criterion, could be connected thereto, in order to perform the aforesaid multiplexor-selection function. Said sufficiency-signal would be produced by the logical-inverse of an exclusive-or operation on the (polarity-detected/logic-converted) once- and twice-differentiated "Dp"-signals, whereby the polarities of the tuning signals would be reversed if said first- and second-derivatives of the "Dp"-signal have the same sign, because that would indicate that the magnitude of said parameter-pertubation-signal, "Dp", is increasing, indicating that the process is not converging to the required steady- (i.e., stable-) state, as a result of an "inflow"/"outflow" imbalance. For (non-stationary) stochastic processes, such as multi-species diffusions coupled with chemical reactions (or other "birth-death" events), for which the state-trajectories are unknown or uncertain, such "imbalance" or non-stationarity is actually necessary to the (re-balancing) evolution/adaptation of the open-system, so that if one is dealing with such a process, one would not want to utilize the logical "error"-detection and polarity-switching means described above-unless the allometric deviation factor signals are approaching zero prematurely with respect to time or some other process-variable (-group/functional). Prime examples of stochastic processes having at least one non-stationary phase are biological processes and population growth. Hence, another provision of this embodiment is to have the output from said multiplexor fed in as one of the inputs to a second multiplexor. Said (switchably-invertible) multiplexor input would be selected when one or more stability-assessing signals fulfill a suitable truth-functional compound-expression or decision-criterion. On the other hand, when instability/non-stationarity is indicated, the normal "Dp"-velocity signal comprising the other input to said second multiplexor would be selected instead. The presently-devised processor may itself be used as the aforementioned stability assessor/detector, by utilizing the perturbation signal in a suitable manner, such as may be found in the logical scheme set-forth below.

As mentioned above, the "Dp"-signal is a "perturbation" measure that provides an indication of the variability or smoothness of the data, and may thereby be employed as a disturbance/non-stationarity detector, which is used to invoke additional actions to promote the proper compensation of the process or signal by, for example, negating the parameter-sensitivity signals, as described above. It is preferred according to the present invention to detect stationarity by sending the (possibly smoothed) perturbation-velocity-signal, or the (normalized) ratio of said signal to the "L"-parameter signal, through an anti-logarithmic amplifier, such as the Burr-Brown LOG100 device, followed by a window comparator, such as Burr-Brown's model 4115/04, the "go" output of which is a active only when the antilog of a zero (normalized) perturbation-velocity-signal falls within the (appropriately-set) upper and lower voltage-thresholds of said window-comparator. Said anti-log amplifier is optional, as it merely creates a sharper, shifted zero-crossing. The aforementioned, optional, time-averaging (i.e., smoothing) operation may be performed with the circuit shown in FIG. 12, on page 5-12 of the 1982 edition of Burr-Brown's "product data book". The "go" output of the stability-(goal)-detecting window-comparator could be connected directly to the "address"-selecting input of said second multiplexor, in order to permit the passage of the output from the first multiplexor to the output of the second multiplexor, which would be connected to multipliers 40, 41, and 42 in lieu of the output from the first multiplexor. Alternatively, said comparator output could be logically-"ANDed" with the polarity-detected "Dp"-acceleration signal, which provides a sufficient condition for the minimization of the perturbation (i.e., the positivity of the "Dp"-velocity). Hence, a logical-"one" output from said AND-gate would be a necessary and suufficient indication of (local) stationarity so that, through the connection thereof to the address-selecting input of said second-multiplexor, the output from the first multiplexor would be appropriately-"transmitted" to one or more of the aforementioned, parameter-modulating multiplexor(s).

The extension of the present method to multivariable (growth) processes or multicomponent systems is readily accomplished by inserting additional equations and corresponding parameters. Specifically, additional Hamiltonian equations would be formulated, wherein all possible allometric relations (or other functional pairings) between inputs and outputs would be expressed, and adjoined to corresponding S-variable, as formulated in accordance with the defining expression for S, disclosed herein. Thenceforth, the partial differentiation called for by the Maximum Principle would be applied to each Hamiltonian equation with resect to the relevant input and output variables, in turn. Also, a recursive model for each S-variable would be set down, in accordance with the ratiometric expression given herein, as derived from each S-function by total differentiation. The entire formulation can be likewise embellished, starting from the formation of additional S-variables, for systems where the present weight, etc. does not comprise a sufficient statistic, and where past (delayed) input variables must therefore be paired with output variables observed later on.

Subsequent to expanding the formulation to deal with more complex, or accessible (observable) systems, the set of equations generated therefrom would be solved, preferably on a digital computer, in the same manner as is presently described. On this subject, an example of a well-known iterative method of solving such nonlinear equations is the Levenberg-Marquardt algorithm, a modified form of which is implemented in the MathCAD software package sold by MathSoft, Inc. (Cambridge, Mass). In using such software, one must supply the algorithm with guess values of the unknown parameters and variables, from which it conducts a search for the values which best satisfy the constraint equations and inequalities, if any. An example of the latter tye of constraint is to require that the rate of energy intake and the body weight be greater at the later age (time), in comparison to the immediately previous age at which they were measured. Due to the causal effect of nutrition upon growth, it is both viable and logical to first estimate the daily caloric intakes, and then estimate what the present body weight should be, on the basis of the food which has been consumed, and the previous weights. In estimating the optimal caloric intake in the present age-interval, one may choose to first observe the voluntary (ad-libitum) food intake, and to use that observation as the guess value needed to arrive at the desired estimate. Upon arriving at said estimate at the beginning or early part of the present age-interval, one may then attempt to impose the estimated optimal intake upon the infant for the remainder of that particular age-interval. Alternatively, in a more predictive or interceptive spirit, one may utilize the caloric intake at the end, or in the latter part of the previous age-interval as the initial estimate for the present sampling period. The "guess" value of the present body weight can conveniently be taken from a measurement of the body weight at the start of the present age-interval, and may be updated on a uniform or non-uniform basis throughout the interval, by further weighing, or by other standard methods, such as linear prediction, which may also be applied to the time-series formed by the (modified or unmodified) S-process observations made for the particular infant. When a method of prediction is applied to the S-process, and perhaps to the weight-process, as well, the predictions may be used to arrive at the guess-value for the present intake, using the defining expression for S. In this manner, the sampling rate (measuring frequency) may be decreased without significantly degrading system performance. A similar tactic has been employed in dealing with fermentation processes, wherein through the use of either an inferential or deductive (recursive) process model, the rate of carbon dioxide production may be employed, either alone, or in combination with the dilution (feed) rate, in order to arrive at frequent estimates of the biomass concentration or dry weight, based upon infrequent measurements thereof. The present method is distinguished from the approach just alluded to by its use of a uniquely defined (semi-Markovian) state-variable that satisfies a partial differential equation, within which, an important open-system thermodynamic variable, namely, the specific rate of negative entropy or energy consumption (dissipation) is embedded. This S-transformation results in a simplified (i.e, reduced order) closed-loop (control) system, which is readily amenable to optimization, subject to an inherent allometric constraint, or to generalizations thereof. In this latter regard, it is important to recognize that an allometric power-law may not be the most appropriate model for a particular biological or other process, or for a particular dose-response relation. Hence, it should be clear that the present method calls for determining a parsimonious state-space representation for the specific process under consideration. Such process models may include, but are not limited to conservation or non-conservation Lotka-Volterra schemes and generalizations thereof, as well as other nonlinear differential equations, such as synergistic and multiplicative (e.g. quadratic-form) models. An important class of models are those that incorporate both feedback and exogenous, possibly random, input terms, whose correlation structure can be estimated from the dynamic regression residuals. These higher-order types of models may call for adjoinment to the total time-derivative (or total variation) of S, in forming the Hamiltonians, rather than to S itself. Other functional forms which may simply substitute for allometry include polynomial, exponential, asymptotic, Michaelis-Menten, and log-linear forms. It should be noted that S may be further generalized by raising K and possibly L, as well, by additional powers to be estimated.

Another important feature of the present method is that it may be employed in an a-posteriori mode of operation, where it is utilized to provide supplemental (e.g., faster) control to a (sub-optimally controlled) process, which has previously been observed as it approaches a desired terminal condition. In this manner, the early decisions regarding the operation of the process are made taking into account both the (uncertain) initial conditions, and the expected final condition and path thereto. This a-posteriori; approach provides a backward "flow" accumulated strategic information to the early desciions, which enables growth processes with their inherent delays to be managed more effectively. Hence, it is feasible to guide the operation of a particular realization or production cycle of a process having uncertain initial conditions according to a previously-observed reference cycle, used to provide said operational guidance by incorporating said reference information, or portions thereof, into the input data for K and/or W. The same "a-posteriori" approach can be employed in a signal processing context in which the "outflow", W, is replaced by the expected version of the signal, K. This would also be readily implemented in the (analog) circuit embodiment with addition of an arbitrary waveform generator, or a digital (or analog) storage and reproduction system, which may be triggered at the time the signal-to-be-processed is first entering the circuit-means of the invention. An example of the latter signal-reproducing means would be an analog or digital tape-recorder, the output of which might require suitable frequency-to-voltage conversion (i.e., demodulation). Alternatively the incoming "live" signal may be modulated in the same manner as the recorded reference signal. In a hybrid digital/analog control system of the type presently described, a-posteriori or moving-average data for K and W could be entered into a separate, but identical processor, whereby the reference "S"-signal that is produced therefrom could be switched into the "S"-input of multiplier 27 in the real-time processor in place of the spurious S-signal, which is (temporarily) disconnected by "opening the loop" with suitable electronically-controllable switching means (e.g., a multiplexor or data "selector"). Said switching means may also be used to connect the "a-posteriori" circuit to the playback device and to activate the latter. Alternatively, said playback device or moving-averaged signal(s) may be left "in-line" and (continually) compared to the S-signal. This would enable a "Dp"-comparison-signal to be used as the primary basis for opening the loop or, preferably, adjusting the tuning parameters ("slope"-functions) and/or offsets (the "intitial conditions" of the integrators) by using it in place of the real-time perturbation-signal, thereby leading to a faster, higher-fidelity convergence of the tuning parameters and estimated outputs.

In an "off-line" correction system, as more (low-noise) data regarding the process under consideration is acquired, the a-posteriori reference data/signal may be replaced or disconnected in favor of the (newly) observed data. Said "loop-closing" operation may be performed automatically on the basis of the normalized error signal from block 96 in FIG. 1, or the variation thereof, etc. Either of these signals could be used to control the operation of the data selector, etc., particularly with the assistance of one or more comparators to compare the error-signal(s) to fixed or time-varying threshold(s). An example of the latter could be to include a circuit to generate a moving-average of one of said error-signals.

Another circumstance under which it may be desirable to "open the loop(s)" and "inject" more likely information (if the "in-line" approach is not being used) is when there are large, abrupt phase-changes or plant parameter perturbations; automated detection and operational-decisions could be made in the same manner as described for "loop-closing". In the absence of a-posteriori information, the output(s) from one or more moving-average filters could be switched into the system. The equivalent numerical resetting operation consists of replacing spurious data by expected or highly-filtered data. An example of the latter would be obtained by the use of median filtering.

It should be appreciated that the present disclosure has many variations and applications obvious to those skilled in the art but within the scope and spirit of the invention and defined in the appended claims. For example, referring to FIG. 1, additional components to perform some of the aforementioned logical and other operations are outlined, namely, signal-acquisition/logic-conversion circuitry 103, digital (e.g., logic) circuitry 103, digital-to-annalog conversion circuitry 98, power-amplifier 99, and actuator(s) 100. The latter could be controlled in accordance with at least one of the characteristic signals produced by the invention, possibly subsequent to the passage thereof through a classical Wiener filter, or through a univariate or multivariate recursive filter, and the like.

What is claimed is:

1. A method of controlling a physical process to compensate for uncertain perturbations in the process, said method comprising measuring values, K, representing a controlling input to a physical process to be regulated over a time t;

measuring a corresponding set of process output values, W, representing the combined effect of said input values, K, and uncertain and uncompensated perturbations occurring in the process;

relating said process output values, W, to said input values, K, by a multiplicative processing operation characterized by the relation:

$$S = t^{LK/W^a}$$

wherein:
S = synthesized state-variable;
t = elapsed time;
a = process parameter; and
L = coupling parameter;

estimating said perturbations $D_p$ occurring in the process by constraining the multiplicative processing operation by adjoining a deviation relation thereto, and compensating for disturbing effects of said perturbations, $D_p$, upon the physical process by adjusting the input value, K, in accordance with the values S, a, and L.

2. A method as claimed in claim 1 wherein said physical process is the feeding of an infant, wherein W represents weight of the infant and K represents caloric intake.

3. A method as claimed in claim 1 comprising combining with the measured values of W, values of previously observed reference data.

4. A method as claimed in claim 3 comprising combining with the measured values of K, values of previously observed reference data.

5. A method as claimed in claim 1 comprising effecting said deviation relation by a Hamiltonian expression $$S + p(K - bW^a)$$

where
p = a cumulative perturbation parameter; and
b = an allometric compensating parameter.

6. A method as claimed in claim 5 further comprising performing a normalizing operation upon said parameters a, L, and b on the basis of the most recent values for S, K, W, a, L, b, and the most recent derivative of $D_p$, in order to arrive at normalizing values for a, L, and b.

7. A method as claimed in claim 6 further comprising detecting a change of phase in the physical process on the basis of at least one of said normalizing values.

8. A method as claimed in claim 5 further comprising adjusting the controlling input value, K, by replacing the values of S that are interactively synthesized from the process being controlled with values of S produced on the basis of reference data for K and W.

9. A method as claimed in claim 8 further comprising adjusting the parameters a, L, and b on the basis of comparative values of $D_p$.

10. A method as claimed in claim 1 further comprising detecting stationary process conditions by determining congruence of the polarities of once-differentiated and twice-differentiated singular perturbation values $D_p$.

11. A method as claimed in claim 10 further comprising resetting elapsed time in accordance with the outcome of said stationarity detecting operation.

12. A method as claimed in claim 10 further comprising reversing the adjusting of the input value, K, on the basis of said stationary detecting operation.

13. A method as claimed in claim 1 further comprising estimating the output W from said adjusted input value K.

14. A method of controlling a filtering system to remove uncertain perturbations in a signal, said method comprising measuring a value of a signal, K, containing uncertain perturbations $D_p$ occurring in the signal to be filtered relative to time, t, providing values W representing desired variations of said signal K without perturbations, relating said values of W to the value K by a multiplicative filtering operation characterized by the relation $$S = t^{LK/W^a}$$

wherein:
S = synthesized state-variable;
t = elapsed time;
a = process parameter;
L = coupling parameter;

estimating said perturbations $D_p$ occurring in the signal W by constraining the multiplicative filtering operation by adjoining a deviation relation thereto and compensating for the effect of said process perturbations, $D_p$, by adjusting the value K in accordance with the values S, a, L whereby said perturbations are substantially filtered from said signal.

15. A method as claimed in claim 14 comprising effecting said deviation relation by a Hamiltonian expression $$S + p(K - bW^a)$$

wherein:
p = a cumulative perturbation parameter; and
b = an allometric compensating parameter.

16. A method as claimed in claim 14 wherein said values W represent an arbitrary function in time.

17. A method as claimed in claim 14 wherein said values W are filtered values based on the observed values assigned to K.

18. A method as claimed in claim 14 wherein said values W comprise a set of reference values pertaining to the signal K.

19. A method of enhancing an image by compensating for uncertain perturbations in the image, said method comprising measuring values W of elements which compose an image and which contain uncertain perturbations $D_p$ to be filtered to enhance the image, said elements being positioned in said image at distances t from a starting point in a coordinate system, calculating values K as the derivative of W with respect to distance for said elements, additionally relating said values W to values K by a multiplicative processing operation characterized by the relation $$S = t^{LK/W^a}$$

wherein:
- S = synthesized state-variable;
- t = distance from the starting point in one spatial dimension;
- a = process parameter;
- L = coupling parameter;

estimating said perturbations $D_p$ occurring in the values W of the elements which compose the image by constraining the multiplicative processing operation by adjoining a deviation relation thereto, and compensating for the effect of said process perturbations $D_p$ by adjusting the value W in accordance with the values S, a, L thereby to filter the perturbations and enhance the image.

20. A method as claimed in claim 19 comprising effecting said deviation relation by a Hamiltonian expression $$S + p(K - bW^a)$$

wherein:
- p = a cumulative perturbation parameter; and
- b = an allometric compensating parameter.

21. A method as claimed in claim 20 further comprising performing a normalizing operation upon said parameters a, L, and b on the basis of the most recent values for S, K, W, a, L, b, and the most recent derivative of $D_p$, in order to arrive at normalizing values for a, L, and b.

22. Apparatus for controlling a physical process to compensate for uncertain perturbations therein, comprising, sensing means for measuring values K representing input values to the physical process, measuring means for measuring output values W which include uncertain perturbations $D_p$ occurring in the physical process, timing means for measuring elapsed time t of said measuring from a base time, multiplicative processing means for producing values of S represented by the expression $$S = t^{LK/W^a}$$

wherein:
- S = synthesizing state variable,
- t = elapsed time from base time,
- L = coupling parameter, and
- a = characterizing process parameter, reduced order processing means for producing a perturbation signal $D_p$ representative of perturbations occurring in the physical process, and normalizing processing means for receiving values of S from the multiplicative processing means and the values of $D_p$ from the reduced order processing means for producing a set of adjustment signals to cause parameter signals a, b and L to characteristically vary in accordance with inputs to the multiplicative processing means in order to adjust input values K to reduce said perturbation signals and compensate for said perturbations.

23. Apparatus as claimed in claim 22 wherein said reduced order processing means comprises compensator means for multiplicatively combining the values of S from said multiplicative processing means with values of quantities produced by said compensator means to produce said signal $D_p$, p being the Lagrange multiplier of an allometric constraint applied to S to form a Hamiltonian expression H including the term $p(K - bW^a)$ wherein b is an allometric compensating parameter.

24. Apparatus as claimed in claim 23 wherein said sensing means measures caloric input supplied to an infant and said measuring means measures weight of the infant.

25. Apparatus for filtering a signal to compensate for uncertain perturbations therein, comprising, sensing means for measuring values of signal K, to be filtered, containing uncertain perturbations $D_p$ occurring in said signal, signal generator means for producing signals W representing desired variations of said signal K, timing means for measuring elapsed time t of said signals from a base time, multiplicative processing means for producing values of S represented by the expression $$S = t^{LK/W^a}$$

wherein:
- S = synthesizing state variable,
- t = elapsed time from base time,
- L = coupling parameter, and
- a = characterizing process parameter, reduced order processing means for producing a perturbation signal $D_p$ representative of perturbations occurring in signal K, and normalizing processing means for receiving values of S from the multiplicative processing means and the values of $D_p$ from the reduced order processing means for producing a set of adjustment signals to cause parameter signals a, b and L to characteristically vary in accordance with inputs to the multiplicative processing means in order to adjust signal K to filter said perturbation signals and compensate for said perturbations.

26. Apparatus as claimed in claim 25 wherein said reduced order processing means comprises compensator means for multiplicatively combining the values of S from said multiplicative processing means with values of quantities produced by said compensator means to produce said signal $D_p$, p being the Lagrange multiplier of an allometric constraint applied to S to form a Hamiltonian expression H including the term $p(K - bW^a)$ wherein b is an allometric compensating parameter.

27. Apparatus for enhancing an image by compensating uncertain perturbations in the image, comprising means for measuring values W of elements which compose an image and which contain uncertain perturbations $D_p$ to be filtered to enhance the image, said elements being positioned in said image at distances t from a starting point in a coordinate system, means for calculating values K as the derivative with respect to distance of W for said elements, multiplicative processing means for producing values of S represented by the expression $$S = t^{LK/W^a}$$

wherein:
S = synthesizing state variable,
t = distance from the starting point in one spative dimension,
L = coupling parameter, and
a = process parameter,
reduced order processing means for producing a perturbation signal $D_p$ representative of perturbations occurring in the values W of the elements which compose the image, and
normalizing processing means for receiving values of S from the multiplicative processing means and the values of $D_p$ from the reduced order processing means for producing a set of adjustment signals to cause parameter signals a, b and L to characteristically vary in accordance with inputs to the multiplicative processing means in order to adjust the values of W in accordance with the values of S, a, L, thereby to filter the perturbations and enhance the image.

28. Apparatus as claimed in claim 27 wherein said reduced order processing means comprises compensator means for multiplicatively combining the values of S from said multiplicative processing means with values of quantities produced by said compensator means to produce said signal $D_p$, p being the Lagrange multiplier of an allometric constraint applied to S to form a Hamiltonian expression H including the term $p(K-bW^a)$ wherein b is an allometric compensating parameter.

* * * * *